United States Patent [19]
Pedersen

[11] 3,730,070
[45] May 1, 1973

[54] REAR WINDOW DEFROSTER

[76] Inventor: Reuben L. Pedersen, 1303 5th Avenue, Stillwater, Minn. 55082

[22] Filed: June 4, 1971

[21] Appl. No.: 150,086

[52] U.S. Cl. ............................98/2.04, 98/2.13, 98/23
[51] Int. Cl. ................................................B60h 1/24
[58] Field of Search........................98/10, 15, 21, 23, 98/2.04, 2.13, 2.19

[56] References Cited

UNITED STATES PATENTS 1,969,151  8/1934  Plew..........................................98/15
2,715,866  8/1955  Mousel.....................................98/2.13
2,384,769  9/1945  Ray..........................................98/2.04

Primary Examiner—Meyer Perlin
Attorney—Robert M. Dunning

[57] ABSTRACT

A wind driven rear window defroster adapted to be mounted in the side window space of a vehicle so as to circulate and direct warm air from the interior of the car onto the rear window for defrosting purposes, the circulating fan being driven by a wind driven fan outside the vehicle.

1 Claim, 4 Drawing Figures

Patented May 1, 1973 3,730,070

INVENTOR
REUBEN L. PEDERSEN
BY Robert M. Dunning
ATTORNEY

REAR WINDOW DEFROSTER

BACKGROUND OF THE INVENTION

A common problem today with automobiles, especially in colder climates, involves the continual frosting up of the inside surface of the rear window. A number of systems have been proposed to avoid this including heated rear windows and elaborate passageways designed to bring air from the front part of the car back to the rear and direct it on the window. The problem is particularly acute on the large gradually sloped windows common to cars of modern design. Most of the prior art solutions to this problem are expensive and involve extensive modifications to the vehicle in question. Since the defrosting problem comes only occasionally during the course of a year this particular modification is usually not purchased with the automobile and consequently many cars on the road today must suffer the consequence of a fogged rear window on the occasions when it does happen. My invention provides an apparatus which can be simply added to an automobile without any modifications whatsoever which will promptly clear the rear window of fog whenever the climatic conditions require it.

BRIEF SUMMARY OF THE INVENTION

My invention contemplates a defrosting unit designed to be mounted in the window of a vehicle having a wind driven fan on the outside connected to drive a fan on the inside of the vehicle which inside fan circulates warm air against the rear window of the vehicle. Integral with the apparatus of my invention is a clear plastic window insert upon which the defrosting apparatus is mounted. This insert is specifically chosen for the particular model car in question and fits directly into the space provided by partially rolling one of the vehicle side windows down.

Many advantages are afforded by my invention. Since no constrictive passage ways must be built into the body of the car itself a relatively large fan can be employed moving a very high volume of air across the rear window. This is advantageous for large rear windows positioned back in a large dead air space behind the rear seat. My invention is removable in a matter of seconds so that it can be carried on the car only when frosting conditions are encountered. Since the invention is mounted on a transparent plastic insert visibility is not hindered to any substantial degree. Furthermore, the plastic insert may be changed at a very low cost so that the defroster unit is readily adaptable to different vehicles and therefore of great value to the typical car owner who may change vehicles quite often over a relatively short period of time. Since my invention is driven by wind there is virtually no power consumption and electrical connections are unnecessary. My defroster can be added to an automobile and removed again without damaging the vehicle at all. Not even so much as a small screw hole is necessary for the mounting of the present invention. It may therefore be seen that my invention provides an improved accessory type rear window defroster for use with a variety of different types of vehicles. Further objects and advantages will become apparent upon consideration of the following description and drawings.

DESCRIPTION OF THE PREFERRED EMBODIMENT

Figure 1:
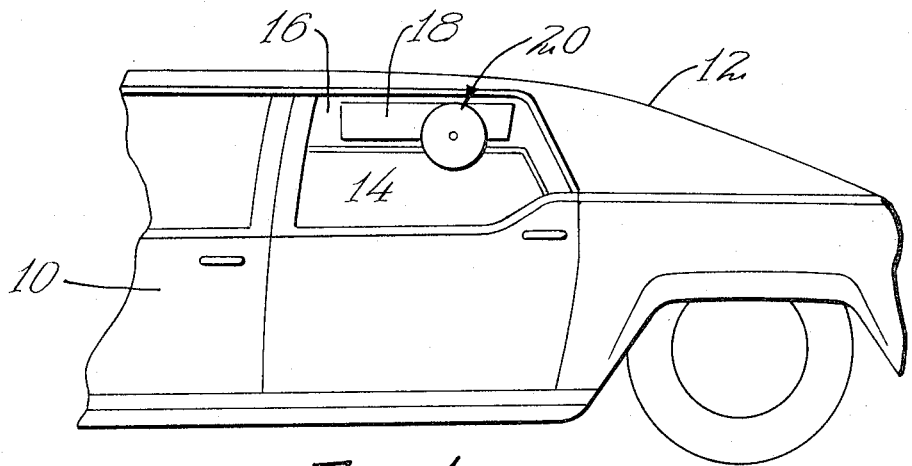
FIG. 1 is a side view of a portion of an automobile showing the rear window defroster of the present invention installed therein.

Referring to FIG. 1 a car 10 is generally shown having a rear window 12. The defroster of the present invention is schematically shown and generally indicated by the numeral 20. As can be seen, installation of my invention is afforded by rolling a window 14 partially down and inserting in the exposed space a clear plastic insert 16 upon which defroster 20 is mounted.

Figure 2:
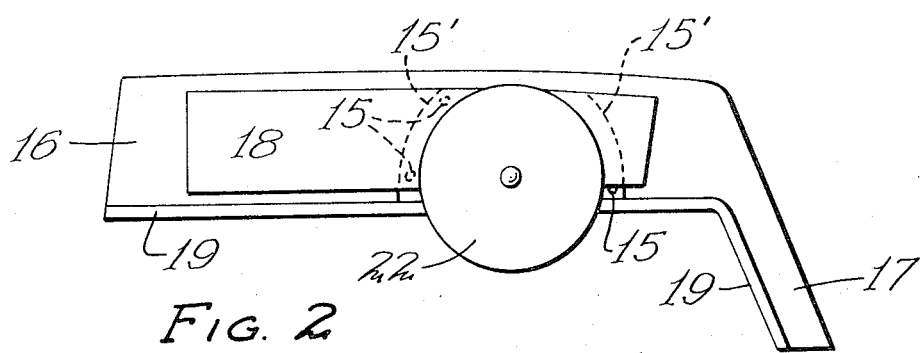
FIG. 2 is an enlarged view of just the defroster and window mounting insert shown in FIG. 1.
Figure 3:
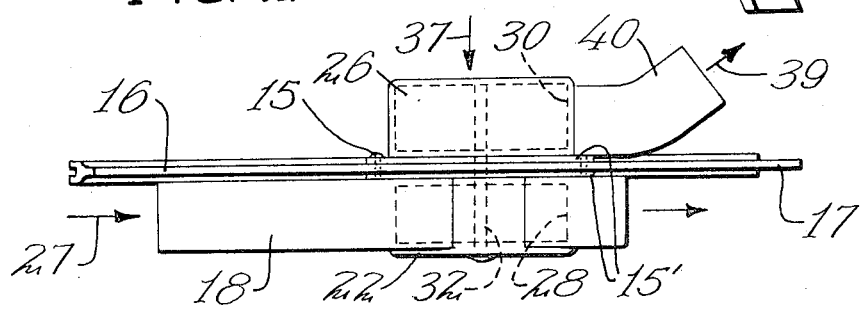
FIG. 3 is a top view of the apparatus of FIG. 2.
Figure 4:
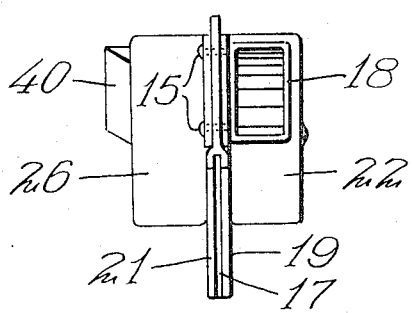
FIG. 4 is a front or end view of the apparatus of FIG. 2.

Referring simultaneously to FIGS. 2, 3 and 4 it may be seen that clear plastic insert 16 is provided with a tail portion 17 designed to fit down into the narrow crack usually left by the rolling down of window 14. A different plastic insert is provided for each of the wide variety of vehicles on which my invention has applicability. Since the defroster of the present invention is easily mounted to the clear plastic insert 16, such as by screws 15 or the like through a mounting flange 15', the transfer to a new vehicle may be easily managed by simply bolting the defroster unit to a new plastic insert. Insert 16 and tail piece 17 are both provided at their lower edges with a pair of flanges 19 and 21 designed to fit over the edge of window 14. Since insert 16 is approximately the same thickness as window 14 the entire apparatus is secured in place by rolling window 14 up sufficiently to position clear plastic insert 16 and tail piece 17 into the same slot that window 14 normally rolls up into. The defroster unit provides an air intake tunnel 18 which directs incoming air indicated by arrow 27 onto a turbine or fan 28 enclosed within a fan housing 22. The air exhausts to the rear as shown by arrow 23. Fan or turbine 28 is mounted on a shaft 32 which passes through the clear plastic insert 16 to drive another fan 30 mounted inside a housing 26. The particular design of the fan is not essential to the operation of the present invention and any type of fan well known to those skilled in the art may be suitably employed. In the preferred embodiment fan 30 comprises a familiar squirrel cage type of fan wherein the air enters as shown by an arrow 37 into the center of the fan and is exhausted outward as shown by an arrow 39 from a duct 40. Duct 40 is angled slightly inwards and upwards so as to better direct the flow of air onto rear window 12. Since a normal automobile heater provides a fair amount of warm air inside the car my invention will circulate that warm air inside the car thus moving it across the rear window and defrosting the window quickly. If desired other embodiments of my invention may be provided in which fan 30 inside the vehicle is connected to a duct extending forward so as to better capture the warm air at the front of the vehicle. The construction of the air tunnel housings, and the fan housing can also vary widely without departing from the spirit and scope of the invention and may comprise plastic materials or any other suitable constructional material of relatively adequate strength and lightweight. Another modification contemplated by my invention involves suitable bracing means fastened to the transparent panel or fan housing operable to be connected to the handle inside the vehicle which is used to raise and lower the window. The bracing means serves to prevent the window from rolling down during vehicle operation. Considering these variations the following claims are presented to cover the invention only on its patentable aspects and in the spirit and scope which it deserves.

I claim:

1. A rear window defroster for a passenger car comprising a wind driven turbine fan carried outside the car on a transparent panel adapted to be secured to the top of a partially rolled down side window in the car; said transparent panel comprising a clear plastic window insert shaped to fit the opening in the car produced by partly lowering the side window in the car, said insert having a slot on its bottom edge sized to accept the top of the car window; said turbine being connected to drive a window defrosting squirrel cage fan carried inside said car on said transparent panel, said wind driven fan and said defrosting fan being connected together by a shaft through said transparent panel and further including a wind channeling shroud surrounding said wind driven turbine fan to direct wind flow thereacross and a second shroud surrounding said defrosting fan shaped to gather warm air inside the car and direct it to the rear window.

* * * * *